Sept. 30, 1947. G. KONING Re. 22,921

MACHINIST'S GAUGE

Original Filed Nov. 22, 1944

INVENTOR:
Gerald Koning.

BY Geo B Rawlings.
ATTORNEY

Reissued Sept. 30, 1947

Re. 22,921

UNITED STATES PATENT OFFICE 22,921

MACHINIST'S GAUGE

Gerald Koning, Muskegon, Mich., assignor to The L. S. Starrett Company, Athol, Mass.

Original No. 2,397,492, dated April 2, 1946, Serial No. 564,625, November 22, 1944. Application for reissue October 16, 1946, Serial No. 703,456

8 Claims. (Cl. 33—162)

This invention appertains to improvements in gauges for the use of machinists in shop practice, and has for one of its several objects to provide a type thereof for the precision measurement of heights on planers, shapers, and like machines, and for similar purposes; the gauge being a combination of spirit level mounted in an opening in a right-angle triangular block or frame and a slidable gauge head that is adapted to be adjustably clamped in set position on the slotted hypothenuse surface of the block or frame.

Another object of the invention has to do with the provision of a gauge of this kind, which embodies certain refinements in its features of adjustment, the same being designed to allow the gauge head to be set quickly at a roughly approximated position and thereafter adjusted with precision to a final setting and secured against accidental displacement from such final setting; the general functions of this type of gauge are fully set forth in the U. S. Patent No. 1,202,114, to Leroy S. Starrett, and are therefore well understood through the use of various modified forms in the trade.

With these and other objects and advantages in view, the invention resides in the certain new and useful combination, construction, and arrangement of parts, as will be hereinafter more fully described, set forth in the appended claims, and illustrated in the accompanying drawing, in which:

Figure 1:
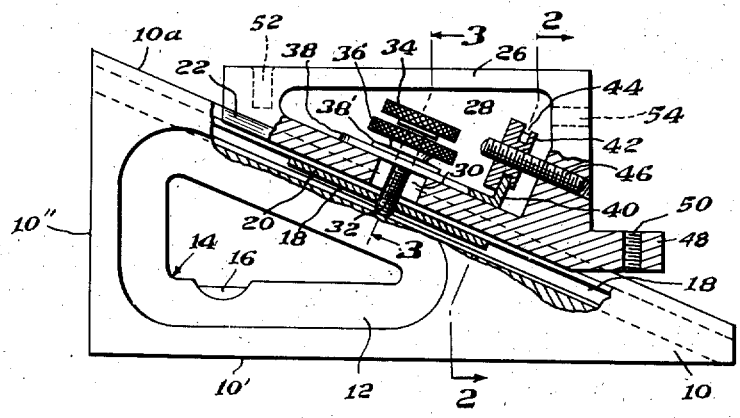
Figure 1 is a side elevation of the improved gauge, in accordance with the invention; a portion of the upper inclined side of the block or frame being broken away to show the slotted hypothenuse surface thereof and the clamp means for securing the sliding head in a position of adjustment thereon.
Figure 3:
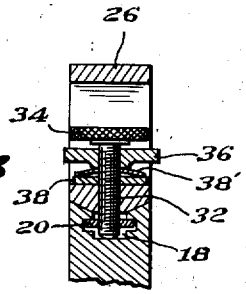
Figure 3 is a fragmentary sectional view, taken on the line 3—3 of Figure 1, looking in the direction of the arrows.
Figure 2:
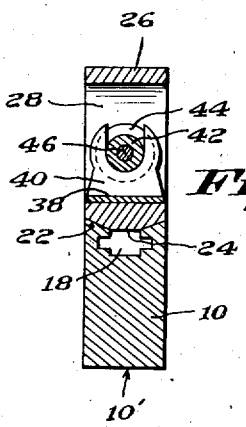
Figure 2 is a vertical transverse section, taken through the line 2—2 on Figure 1.

Referring to the drawing in detail, the improved gauge, as it is exemplified therein, is comprised in a triangular frame 10 having a central web 12 with an opening 14 in which a spirit level 16 is positioned to indicate the true horizontal position of the lower side 10′, or the true vertical position of the side 10″, of the frame 10. The inclined side 10*a* is formed to provide a T-slot 18 in which a clamp plate 20 is guided. The surface of the inclined side 10*a* is longitudinally channeled, as at 22, with the opposite sides of the channel diverging upwardly from a slot 24 opening into the upper side of the T-slot 18.

Positioned on the inclined side 10*a*, of the frame 10, is a slidable gauge head 26 which has its base surface shaped to conform to that of the channel 22 for its stable support therein. The gauge head 26 has an opening through the same, as at 28, and an elongated opening or slot 30 through its lower side for the passage through the latter of a clamp screw 32 that has its lower end engaged with the slide plate 20. The screw 32 passes upwardly from the opening 30 through a second clamp plate 38 and into the opening 28, where it is provided with a knurled head 34 and a knurled lock nut 36. The slide plate 38 rests upon the lower inclined side of the opening 28 and is provided with an upturned end 40, which is engaged in an annular groove 44 formed in a knurled adjusting nut 42 engaged on the headless bolt 46 that is screw threaded into the near end wall of the opening 28. A shoulder 48 is offset from the lower end of the longer vertical side of the gauge head 26 and is, together with the top horizontal side of the latter, provided with screw threaded openings 50 and 52, respectively; a like opening 54 being also formed in the longer vertical side, at a point above the position of the headless bolt 46 therein. These tapped openings 50, 52, and 54 are provided to interchangeably receive measuring posts (not shown) of varying lengths to correspondingly vary the measuring range of the gauge, as is well understood by those skilled in general machine shop practices.

In the use of the gauge, as it is thus constituted, the gauge head 26 is to be quickly moved relatively to the triangular frame 10 to a roughly approximated setting thereon, upon the loosening up of the clamp plates 20 and 38, and a spring washer 38′ bearing on the clamp plate 38, by a proper manipulation of the clamp screw 32 from the knurled head 34 and the lock nut 36. The gauge head 26 will be secured in this approximated position, sufficiently to prevent accidental displacement during further handling, by the down turning of the clamp screw 32 which, when its lower end contacts the bottom of the groove 18, forces the clamp plate 20 upwardly against the upper walls of the cross-slot of the latter. When thus positioned and lightly secured, the gauge head 26 will be slowly and accurately adjusted to its final setting by a proper manipulation of the knurled nut 42 on the bolt 46. Here, the gauge head 26 will be rigidly secured by a tightening of the lock nut 36 downwardly against the spring washer 38′ and the clamp plate 38, in which movement of the lock nut the spring washer is placed under a tension which acts to exert a lift on the clamp screw 32, forcing the clamp plate 20 into a more secure clamping engagement with the upper walls of the cross-slot of the groove 18.

Having thus fully described my invention, it is to be understood that any and all changes in the construction and arrangement of parts, to which the disclosed embodiment thereof is susceptible, may be resorted to, without departing from the spirit of the invention or its scope as claimed.

What I claim is:

1. A machinist's gauge, including a triangular frame having base surfaces at right angles to each other and a hypothenuse surface provided with a T-slot coextensive therewith, a gauge head slidably mounted on said hypothenuse surface and having a side opening, a clamp screw carried by said gauge head and projecting therefrom into said T-slot and said side opening, a clamp plate carried by said clamp screw within said T-slot, a second clamp plate positioned within said side opening and engaged on said clamp screw, a spring washer engaged on said clamp screw and bearing on said second clamp plate, a bolt carried by said gauge head and projecting into said side opening in right angular relation to said clamp screw, a knurled nut carried by said bolt and engaged with said second clamp plate to impart precision adjustment to said gauge head, and a lock nut carried on said clamp screw and adapted to be tightened against said spring washer to secure the gauge head in adjusted position between said clamp plates.

2. The invention as in claim 1, with said second clamp plate provided with an upturned end portion which is engaged in an annular groove formed in the said knurled nut.

3. A gauge comprising a base having an inclined upper face, said base having therein a T-slot extending contiguously to said upper face and opening through the latter, a gauge head including a bottom portion slidably seated upon said inclined face and having an elongated slot therein, a plate seated upon said bottom portion of said gauge head, screw means extending through said plate and said elongated slot, means in said T-slot engageable with walls defining the top of the latter and with which said screw means is cooperable initially to clamp said plate lightly against said gauge head and the latter lightly against the inclined face of said base to secure said gauge head initially in a position of rough adjustment along said inclined face and also to secure said plate against movement longitudinally relative to said base, and means connected to and reactable from said plate to effect a final precise adjustment of said gauge head along said inclined face, said screw means being operable following said precise adjustment to clamp said gauge head tightly against said inclined face.

4. A gauge comprising a base having an inclined upper face, a gauge head seated upon said inclined face for sliding adjustments therealong, a plate seated upon said gauge head, means for initially clamping said plate lightly against said gauge head and the latter lightly against said inclined face to secure said gauge head initially in a position of rough adjustment along said inclined face and also to secure said plate against movement longitudinally relative to said base, and means connected between said plate and said gauge head reactable from the former to effect a final precise adjustment of the latter along said inclined face, said clamping means being operable following said final precise adjustment to clamp said plate firmly against said gauge head and the latter firmly against said inclined face.

5. A gauge as set forth in claim 4, said means for initially clamping including screw means for clamping the plate against the gauge head and the latter against the inclined face of the base.

6. A gauge as set forth in claim 4, said means for effecting a final precise adjustment including screw means connected between the plate and the gauge head reactable from the former to adjust the latter along the inclined face of the base.

7. A gauge comprising a base having an inclined upper face, a gauge head seated upon said inclined face for sliding adjustments therealong and having therein an elongated slot, a plate seated upon said gauge head, screw means extending through said plate and said slot and cooperating with said plate, gauge head and base to hold said plate seated upon said gauge head and the latter seated upon said inclined face, said screw means being adjustable longitudinally relative to said inclined face and being secureable relative to said base in any such adjusted position and when secured serving to hold said plate against longitudinal movement relative to said inclined face, and a connection between said plate and said gauge head reactable from the former to adjust the latter longitudinally relative to said inclined face, said screw means being effective to clamp said plate against said gauge head and the latter against said inclined face to maintain said gauge head in adjusted position relative to said inclined face.

8. A gauge comprising a base having an inclined upper face, said base having therein a T-slot extending contiguously to said upper face and opening through the latter, a gauge head including a bottom portion seated upon said inclined face for adjustment therealong and having an elongated slot therein, a plate in said T-slot engageable with walls defining the top of the latter, a second plate seated upon the bottom portion of said gauge head, a screw extending through said second plate and said elongated slot and through and having threaded engagement with said first mentioned plate and engageable at its bottom with the wall defining the bottom of said T-slot to urge said first mentioned plate upwardly into clamping engagement with the walls defining the top of said T-slot and thus secure said screw against movement along said T-slot and thereby secure said second mentioned plate against movement relative to said base, screw means between said second mentioned plate and said gauge head reactable from the former to adjust the latter along said inclined face, and a nut threaded on said screw for cooperation with said second mentioned plate to clamp the latter against the bottom portion of said gauge head and to clamp said gauge head against said inclined face.

GERALD KONING.

REFERENCES CITED

The following references are of record in the file of this patent:

UNITED STATES PATENTS

| Number | Name | Date |
|---|---|---|
| 875,050 | Conlon | Dec. 31, 1907 |
| 1,202,114 | Starrett | Oct. 24, 1916 |
| 2,242,116 | Donaway | May 13, 1941 |